United States Patent
Li et al.

(10) Patent No.: US 12,276,499 B2
(45) Date of Patent: Apr. 15, 2025

(54) LOW-ENERGY-CONSUMPTION FLOATING AUTOMATIC OCEANOGRAPHIC AND METEOROLOGICAL OBSERVATION PLATFORM

(71) Applicant: DONGHAI LABORATORY, Zhejiang (CN)

(72) Inventors: Qian Li, Zhoushan (CN); Ruyan Chen, Zhoushan (CN); Zhiguo He, Zhoushan (CN); Yonghui Liu, Zhoushan (CN); Xuancheng Liu, Zhoushan (CN); Xin Zhang, Zhoushan (CN); Sai Zhang, Zhoushan (CN)

(73) Assignee: DONGHAI LABORATORY, Zhoushan (CN)

( * ) Notice: Subject to any disclaimer, the term of this patent is extended or adjusted under 35 U.S.C. 154(b) by 0 days.

(21) Appl. No.: 18/963,728

(22) Filed: Nov. 28, 2024

(65) Prior Publication Data

US 2025/0093154 A1    Mar. 20, 2025

(30) Foreign Application Priority Data

Jun. 11, 2024   (CN) .......................... 202410747154.0

(51) Int. Cl.
  *G01C 13/00*    (2006.01)
  *B63B 35/44*    (2006.01)
  (Continued)

(52) U.S. Cl.
  CPC .............. *G01C 13/00* (2013.01); *B63B 35/44* (2013.01); *B63B 79/15* (2020.01); *G01W 1/02* (2013.01);
  (Continued)

(58) Field of Classification Search
  USPC .......................................... 73/170.16–170.28
  See application file for complete search history.

(56) References Cited

U.S. PATENT DOCUMENTS

| | | |
|---|---|---|
| 11,939,030 B1 | 3/2024 | Ren et al. |
| 2015/0128842 A1 | 5/2015 | Webb et al. |

(Continued)

FOREIGN PATENT DOCUMENTS

| | | |
|---|---|---|
| CN | 101738179 A | 6/2010 |
| CN | 103994757 A | 8/2014 |

(Continued)

OTHER PUBLICATIONS

First Office Action in Chinese Application No. 202410747154.0 mailed on Jul. 12, 2024, 13 pages.

(Continued)

*Primary Examiner* — Andre J Allen
(74) *Attorney, Agent, or Firm* — Porus IP LLC (57) ABSTRACT

Disclosed is a low-energy-consumption floating automatic oceanographic and meteorological observation platform, comprising a meteorological observation module, a sea surface monitoring module, and a profile observation module. The meteorological observation module is configured to provide a buoyant platform for realizing observation of meteorological data while guaranteeing power supply and providing a space for equipment placement. The sea surface monitoring module is configured to realize observation of sea surface data while preventing the buoyant platform from drifting. The profile observation module is located below the meteorological observation module and configured to complete automatic observation of an ocean profile in a low-energy-consumption manner. Gravity is regulated to change a combined force of buoyancy and gravity to realize upward or downward movements of the device, which effectively replaces the conventional high energy consumption program. Meanwhile, a portion of energy in sinking of the profile observation module is converted into elastic potential (Continued)

energy and released subsequently, which reduces energy consumption.

5 Claims, 5 Drawing Sheets

(51) Int. Cl.
  *B63B 79/15* (2020.01)
  *G01W 1/02* (2006.01)
  *H01Q 1/34* (2006.01)
(52) U.S. Cl.
  CPC ........ *H01Q 1/34* (2013.01); *B63B 2035/4466* (2013.01)

(56) References Cited

U.S. PATENT DOCUMENTS

| | | | |
|---|---|---|---|
| 2018/0162501 A1 | 6/2018 | Peterson et al. | |
| 2022/0185436 A1 | 6/2022 | Kaneshika | |

FOREIGN PATENT DOCUMENTS

| | | | | |
|---|---|---|---|---|
| CN | 108674617 A | * | 10/2018 | ............... B63G 8/14 |
| CN | 109050796 A | * | 12/2018 | |
| CN | 111532382 A | | 8/2020 | |
| CN | 112710285 A | | 4/2021 | |
| CN | 113126180 A | | 7/2021 | |
| CN | 113212660 A | | 8/2021 | |
| CN | 113607139 A | | 11/2021 | |
| CN | 114609353 A | | 6/2022 | |
| CN | 116853425 A | | 10/2023 | |
| CN | 116985959 A | | 11/2023 | |
| CN | 117799768 A | | 4/2024 | |
| KR | 100946942 B1 | | 3/2010 | |
| KR | 102329772 B1 | | 11/2021 | |

OTHER PUBLICATIONS

Notification to Grant Patent Right for Invention in Chinese Application No. 202410747154.0 mailed on Jul. 24, 2024, 6 pages.

* cited by examiner

510 — Performing preliminary prediction of profile observation data at different depths under a sea surface through a prediction model based on terrain information, meteorological data at a previous moment collected by a meteorological detector, sea surface data at the previous moment collected by a second ocean detector, and profile observation data at the previous moment to obtain preliminary prediction data at the current moment

520 — Determining a collection strategy at a current moment based on the preliminary prediction data

530 — Controlling a profile observation module to perform data collection based on the collection strategy to obtain profile collection data at the current moment

540 — Determining whether a parameter of the prediction model needs to be adjusted based on the preliminary prediction data and the profile collection data

550 — In response to determining that the parameter of the prediction model needs to be adjusted, performing operations 551-552

- 551 — Adjusting a model parameter of the prediction model based on the preliminary prediction data and the profile collection data
- 552 — Re-predicting based on an adjusted prediction model to obtain prediction data at the current moment, and determining profile observation data at the current moment based on the prediction data and the profile collection data

560 — In response to determining that the parameter of the prediction model does not needs to be adjusted, performing operation 561

- 561 — Determining the profile observation data at the current moment may be determined based on the preliminary prediction data and the profile collection data

FIG. 5

LOW-ENERGY-CONSUMPTION FLOATING AUTOMATIC OCEANOGRAPHIC AND METEOROLOGICAL OBSERVATION PLATFORM

CROSS-REFERENCE TO RELATED APPLICATIONS

This application claims priority to Chinese Application No. 202410747154.0, filed on Jun. 11, 2024, the entire contents of which are incorporated herein by reference.

TECHNICAL FIELD

The present disclosure relates to the field of ocean observation, and in particular to a low-energy-consumption floating automatic oceanographic and meteorological observation platform.

BACKGROUND

Oceanographic and meteorological observation plays an indispensable role as an important means for understanding and monitoring the marine environment, climate change, weather system, marine ecology and resources, etc. Data such as temperature, salinity, barometric pressure, and humidity of the ocean surface and the atmosphere can be obtained through oceanographic and meteorological observation to help scientists understand the dynamic changes and laws of the ocean and atmosphere. The data is of great significance for climate prediction, weather forecast, marine resource development, marine ecological protection, or the like, and plays a key role in the sustainable development of human society.

Conventional oceanographic and meteorological observation devices usually rely on batteries to supply power to run sensors, communication devices, and other electronic devices. However, it is very difficult to replenish electricity in the marine environment, especially in remote regions such as far out to sea. Replacing energy supply equipment faces problems such as high cost, complex operation, and high risk. Long-term continuous automatic observation requires constant energy consumption, especially ocean profile observation that requires equipment to float up and down multiple times. At present, most automatic oceanographic and meteorological observation devices mainly conduct atmospheric and sea surface observation, while profile observation has not been fully developed.

Therefore, it is desirable to provide a low-energy-consumption floating automatic oceanographic and meteorological observation platform, which effectively reduces energy consumption and realizes synchronous and automatic observation of the atmosphere, the sea surface, and the profile.

SUMMARY

The embodiments of the present disclosure provide a low-energy-consumption floating automatic oceanographic and meteorological observation platform. The low-energy-consumption floating automatic oceanographic and meteorological observation platform may comprise a meteorological observation module, a sea surface monitoring module, a profile observation module, floating body strips, and a rope channel. The meteorological observation module may be configured to provide a buoyant platform to realize observation of meteorological data while guaranteeing power supply and providing a space for equipment placement. The sea surface monitoring module may be configured to realize observation of sea surface data while preventing the buoyant platform from drifting. The profile observation module may be located below the meteorological observation module and configured to complete automatic observation of an ocean profile in a low energy consumption manner. The profile observation module may include a bobbin, a clockwork, a rope, a gravity regulation bin, an electrically operated gas valve, a high-pressure gas storage cylinder, electrically operated gates, and a first ocean detector. The bobbin may be configured to wind and store the rope. The clockwork may be secured to the bobbin and configured to convert a portion of kinetic energy generated during sinking of the first ocean detector into elastic potential energy to be stored and released in a subsequent upward movement. The rope may be configured to connect the gravity regulation bin and the first ocean detector. The gravity regulation bin may be configured to regulate gravity to realize upward and downward movements of the first ocean detector. The electrically operated gas valve may be configured to regulate a gas release process in the high-pressure gas storage cylinder, i.e., an intake process. The meteorological observation module may include a communication antenna, a meteorological detector, a hollow support barrel, a solar panel, and a data collector. The communication antenna may be configured to communicate with a remote transmitting device. The meteorological detector may be configured to detect an atmospheric condition and generate the meteorological data. The hollow support barrel may be configured to support the communication antenna and the meteorological detector. The solar panel may be configured to generate electricity. The data collector may be configured to collect and store data generated by various detectors. The sea surface monitoring module may include a floating body block, a connection chain, a second ocean detector, and an anchor chain. The floating body block may be configured to disperse a sinking position of the anchor chain, display positioning, and provide identification. The connection chain may be connected with the meteorological observation module and configured to transmit a force to stabilize the buoyant platform. The second ocean detector may be configured to detect an ocean state of a sea surface and generate the sea surface data. The anchor chain may be configured for anchoring to prevent the buoyant platform from drifting. The meteorological observation module may further include a control center. The control center may be configured to control the electrically operated gas valve and the electrically operated gates to regulate time of gas intake, water intake, exhaust, and drainage. The control center may be secured in a floating body housing. The floating body housing may be configured to insulate internal devices from wind and waves and provide buoyancy. The floating body strips may be secured to the rope and configured to increase the buoyancy of the rope to reduce energy consumption of the first ocean detector during the upward movement. The rope channel may be configured to reduce friction loss due to motion steering during upward and downward movements of the rope.

In some embodiments, the floating body housing may further include a storage battery configured to store and supply electricity.

In some embodiments, the second ocean detector may be configured to detect an ocean temperature, an ocean salinity, an ocean current speed, a current direction, an ocean water level, a dissolved oxygen concentration, and a pH value.

In some embodiments, the low-energy-consumption floating automatic oceanographic and meteorological observation platform may further comprise a connection rod. The connection rod may be configured to support the rope channel.

In some embodiments, the first ocean detector may be configured to detect the ocean temperature, the ocean salinity, the ocean current speed, and the current direction.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 5 is a flowchart illustrating an exemplary process of determining profile observation data according to some embodiments of the present disclosure.

Reference signs: 1. meteorological observation module; 2. sea surface monitoring module; 3. profile observation module; 1-1. communication antenna; 1-2. meteorological detector; 1-3. hollow support barrel; 1-4. solar panel; 1-5. data collector; 1-6. storage battery; 1-7. control center; 1-8. floating body housing; 2-1. floating body block; 2-2. connection chain; 2-3. second ocean detector; 2-4. anchor chain; 3-1. bobbin; 3-2. clockwork; 3-3. rope; 3-4. floating body strips; 3-5. connection rod; 3-6. rope channel; 3-7. gravity regulation bin; 3-7-1. water level sensor; 3-7-2. gas sensor; 3-8. electrically operated gas valve; 3-9. high-pressure gas storage cylinder; 3-10. electrically operated gates; 3-11. first ocean detector; 3-12. gas supply device; 3-12-1. air compression device; 3-12-2. gas generation device.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one", "a", "an", "one kind", and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure. It should be appreciated that the preceding or following operations are not necessarily performed in an exact sequence. Instead, steps can be processed in reverse order or simultaneously. Also, it is possible to add other operations to these processes or to remove a step or steps from these processes.

Figure 1:
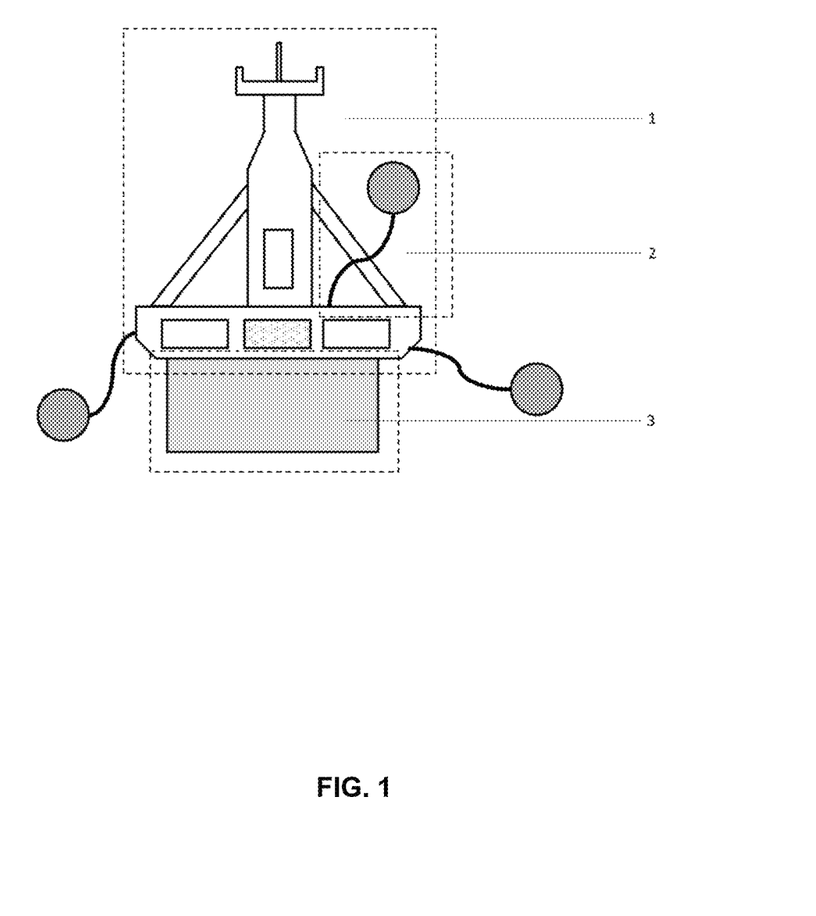
FIG. 1 is a schematic diagram illustrating an exemplary low-energy-consumption floating automatic oceanographic and meteorological observation platform according to some embodiments of the present disclosure.

FIG. 1 is a schematic diagram illustrating an exemplary low-energy-consumption floating automatic oceanographic and meteorological observation platform according to some embodiments of the present disclosure.

As shown in FIG. 1, the low-energy-consumption floating automatic oceanographic and meteorological observation platform in the embodiments of the present disclosure may include: a meteorological observation module 1, a sea surface monitoring module 2, and a profile observation module 3.

In some embodiments, by providing the meteorological observation module, observation of meteorological data and establishment of a buoyant platform foundation can be realized. By providing the sea surface monitoring module, fixed-point observation of sea surface data and establishment of an anchor foundation can be realized. By providing the profile observation module, the energy loss in the mutual conversion process of kinetic energy and potential energy can be actively reduced, such that low-energy-consumption observation of ocean profile data can be realized, and finally automatic observation of atmosphere, sea surface and ocean profile can be realized with low energy consumption.

Figure 2:
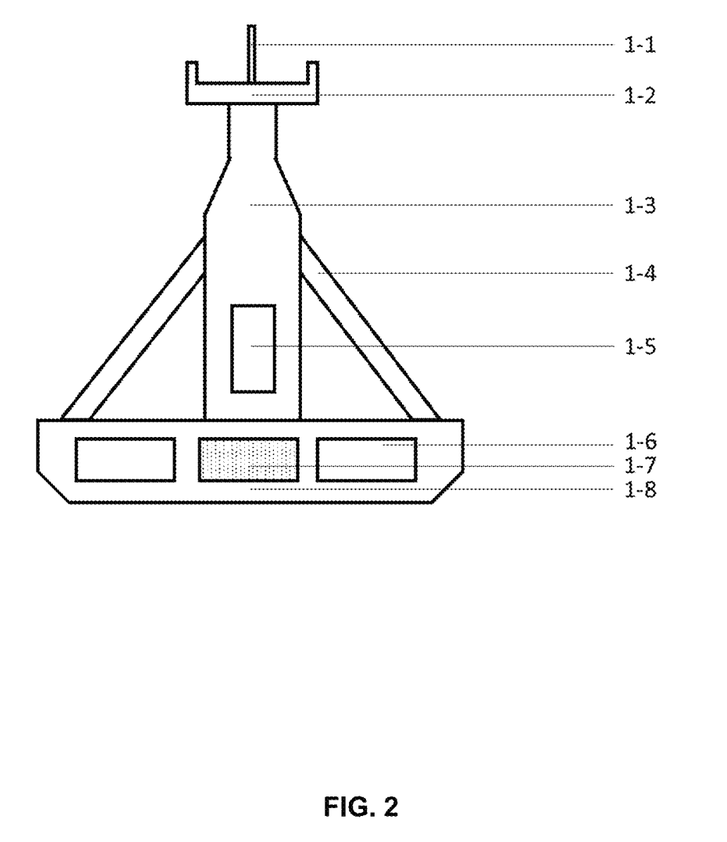
FIG. 2 is a schematic diagram illustrating an exemplary meteorological observation module according to some embodiments of the present disclosure.

FIG. 2 is a schematic diagram illustrating an exemplary meteorological observation module according to some embodiments of the present disclosure.

In some embodiments, as shown in FIG. 2, the meteorological observation module 1 may include a communication antenna 1-1, a meteorological detector 1-2, a hollow support barrel 1-3, a solar panel 1-4, a data collector 1-5, a storage battery 1-6, a control center 1-7, and a floating body housing 1-8.

The meteorological observation module 1 is a module for performing observation of meteorological data. In some embodiments, the meteorological observation module 1 may be configured to provide a buoyant platform to realize reliable observation of the meteorological data while guaranteeing power supply and providing a space for equipment placement. The buoyant platform is a platform body that provides buoyancy for the low-energy-consumption floating automatic oceanographic and meteorological observation platform (hereinafter referred to as the platform).

The communication antenna 1-1 may be configured to communicate with a remote transmitting device. In some embodiments, the communication antenna 1-1 may receive information from the remote transmitting device. For example, the communication antenna 1-1 may communicate with a satellite or a nearby radio station.

The meteorological detector 1-2 is a detector for obtaining the meteorological data. In some embodiments, the meteorological detector 1-2 may be a conventional meteorological element sensor configured to detect an atmospheric condition and generate the meteorological data. In some embodiments, the meteorological data may include seven meteorological elements, including temperature, humidity, barometric pressure, wind speed, wind direction, cloudiness, and precipitation, and may also include visibility and dew-point temperature. The meteorological detector 1-2 has ability to detect nine meteorological elements.

The hollow support barrel 1-3 is a support part that is hollow inside and may be made of a metallic material. In some embodiments, the hollow support barrel 1-3 may be configured to support the communication antenna 1-1 and the meteorological detector 1-2 and connect the solar panel 1-4.

The solar panel 1-4 may be fixed on the hollow support barrel 1-3 and the floating body housing 1-8, and configured to absorb sunlight to generate electricity.

The data collector 1-5 is a collector for collecting and storing related detection data. In some embodiments, the data collector 1-5 may be secured inside the hollow support barrel 1-3. In some embodiments, the data collector 1-5 may be configured to collect and store data produced by various detectors, such as data generated by the meteorological detector 1-2, a first ocean detector, a second ocean detector, or the like.

In some embodiments, the floating body housing 1-8 may include the storage battery 1-6 configured to store and supply electricity.

The control center 1-7 is a part for controlling related parts to assist in observation. In some embodiments, the control center 1-7 may be secured in the floating body housing 1-8. In some embodiments, the control center 1-7 may be configured to control an electrically operated gas valve and electrically operated gates. For example, the control center 1-7 may regulate time of gas intake, water intake, exhaust, and drainage by controlling the electrically operated gas valve and the electrically operated gates. More descriptions regarding the electrically operated gas valve and the electrically operated gates may be found in FIG. 3 and related descriptions thereof.

In some embodiments, the control center 1-7 may be provided with a processor. The processor may be configured to execute program instructions based on data, information, and/or a processing result to perform one or more functions described in the present disclosure. In some embodiments, the processor may include one or more sub-processing devices. Merely by way of example, the processor may include a central processing unit (CPU), an application-specific integrated circuit (ASIC), an application-specific instruction processor (ASIP), a graphics processing unit (GPU) microprocessor, or the like, or any combination thereof.

The floating body housing 1-8 is a housing structure for protecting internal devices and providing buoyancy. In some embodiments, the floating body housing 1-8 may be made of a metallic material and externally wrapped with a corrosion resistant coating, and may be configured to insulate the internal devices from wind and waves and provide buoyancy.

In some embodiments of the present disclosure, the buoyant platform is constructed by providing the meteorological observation module, such that structural foundation and a power foundation are provided for the arrangement of the profile observation module while realizing more stable observation of the meteorological data.

Figure 3:
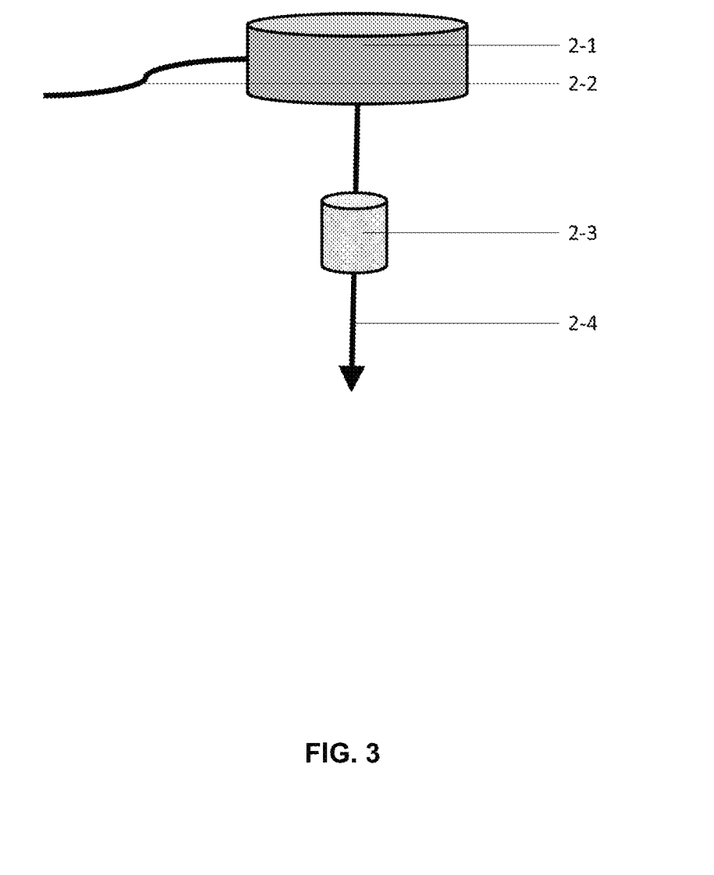
FIG. 3 a schematic diagram illustrating an exemplary sea surface monitoring module according to some embodiments of the present disclosure.

FIG. 3 is a schematic diagram illustrating an exemplary sea surface monitoring module according to some embodiments of the present disclosure.

In some embodiments, as shown in FIG. 3, the sea surface monitoring module 2 may include a floating body block 2-1, a connection chain 2-2, a second ocean detector 2-3, and an anchor chain 2-4.

The sea surface monitoring module 2 is a module for monitoring sea surface data. In some embodiments, the sea surface monitoring module 2 may be configured to realize observation of sea surface data while preventing the platform from drifting.

In some embodiments, the floating body block 2-1 may be made of a lightweight material, such as polyfoam. In some embodiments, the floating body block 2-1 may be configured to disperse a sinking position of the anchor chain 2-4, display positioning, and provide identification for easy identification and avoidance by other vessels or navigators.

The connection chain 2-2 is a structure used to connect different modules. The connection chain 2-2 may be configured to transmit a force to stabilize the buoyant platform. In some embodiments, the connection chain 2-2 may be made of a lightweight material with a relatively high strength and may be configured to connect the meteorological observation module 1 and the sea surface monitoring module 2 and transmit the force therebetween, thereby improving the stability of the whole platform.

The second ocean detector 2-3 is a detector for monitoring sea surface data. That is, the second ocean detector may be configured to detect an ocean state of a sea surface and generate the sea surface data. In some embodiments, the second ocean detector 2-3 may be a sea surface monitoring sensor configured to perform sea surface detection. For example, the second ocean detector 2-3 may be configured to detect an ocean temperature, an ocean salinity, an ocean current speed, a current direction, an ocean water level, a dissolved oxygen concentration, a pH value, or the like.

The anchor chain 2-4 may be configured to anchor to prevent the buoyant platform from drifting. The anchor chain 2-4 may be made of a metallic material.

In some embodiments of the present disclosure, by providing the sea surface monitoring module, the drift resistance of the whole platform is also guaranteed by the anchor chain while realizing the fixed-point observation of the sea surface.

Figure 4:
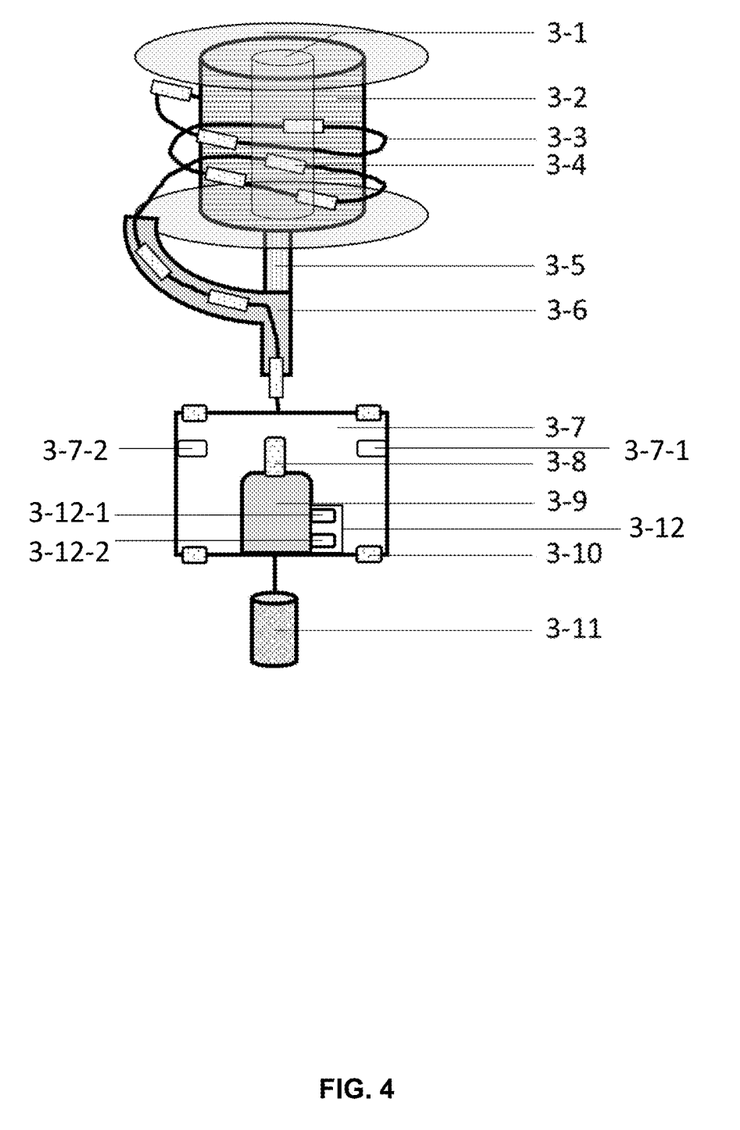
FIG. 4 a schematic diagram illustrating an exemplary profile observation module according to some embodiments of the present disclosure.

FIG. 4 is a schematic diagram illustrating an exemplary profile observation module according to some embodiments of the present disclosure.

In some embodiments, as shown in FIG. 4, the profile observation module 3 may include a bobbin 3-1, a clockwork 3-2, a rope 3-3, floating body strips 3-4, a connection rod 3-5, a rope channel 3-6, a gravity regulation bin 3-7, an electrically operated gas valve 3-8, a high-pressure gas storage cylinder 3-9, electrically operated gates 3-10, and a first ocean detector 3-11.

The profile observation module 3 is a module for observing profile data of the ocean. In some embodiments, the profile observation module may be located below the meteorological observation module 1 and configured to complete automatic observation of an ocean profile in a low energy consumption manner.

In some embodiments, the bobbin 3-1 may be secured to a bottom of the floating body housing 1-8 and configured to wind and store the rope 3-3.

In some embodiments, the clockwork 3-2 may be secured to the bobbin 3-1 and configured to convert a portion of kinetic energy generated in sinking of the first ocean detector 3-11 into elastic potential energy to be stored and released in a subsequent upward movement, thereby reducing the energy loss during the profile observation.

In some embodiments, the rope 3-3 may be connected with the clockwork 3-2 and configured to connect the gravity regulation bin 3-7 and the first ocean detector 3-11.

In some embodiments, the floating body strips 3-4 may be configured to increase the buoyancy of the rope 3-3 to reduce the energy consumption of the first ocean detector 3-11 during an upward movement. In some embodiments, the floating body strips 3-4 may be secured to the rope 3-3. The floating body strips 3-4 may be made of a foam material.

In some embodiments, the connection rod 3-5 may be configured to support the rope channel 3-6. The connection rod 3-5 may be made of a lightweight material with a relatively high strength.

The rope channel 3-6 may be configured to reduce friction loss due to motion steering during upward and downward movements of the rope 3-3. In some embodiments, the rope channel 3-6 may be made of a lightweight material with a relatively high strength, and an inner wall of the rope channel 3-6 may be provided with a coating to reduce friction.

The gravity regulation bin 3-7 is a regulation bin for regulating gravity. In some embodiments, the gravity regulation bin 3-7 may be configured to regulate gravity to change a combined force of the buoyancy and the gravity of the platform, so as to achieve upward and downward movements of the first ocean detector 3-11. The gravity regulation bin 3-7 may be made of a lightweight material with a relatively high strength.

The electrically operated gas valve 3-8 is a device used to regulate an amount of gas in the high-pressure gas storage cylinder. In some embodiments, the electrically operated gas valve 3-8 may have a function of timed automatic on/off, and is capable of receiving an instruction from the control center 1-7 to regulate an on/off time interval. The electrically operated gas valve 3-8 may be configured to regulate a gas release process in the high-pressure gas storage cylinder 3-9, i.e., an intake process.

In some embodiments, the high-pressure gas storage cylinder 3-9 may be secured in the gravity regulation bin 3-7 and configured to regulate a ratio of gas to water in the bin to change the combined force of the gravity and the buoyancy, so as to achieve the upward and downward movement of the first ocean detector 3-11.

In some embodiments, the electrically operated gates 3-10 may have a function of timed automatic on/off, and is capable of receiving an instruction from the control center 1-7 to regulate an on/off time interval. The electrically operated gates 3-10 may be configured to regulate processes of water intake, exhaust, and drainage. In some embodiments, a plurality of electrically operated gates 3-10 may be provided. For example, as shown in FIG. 3, two electrically operated gates 3-10 may be provided on upper and lower sides of the gravity regulation bin 3-7, respectively. The upper two electrically operated gates 3-10 may be configured to control the exhaust process, and the lower two electrically operated gates 3-10 may be configured to control the water intake and drainage process.

The first ocean detector 3-11 is a detector for detecting data related to an ocean profile. In some embodiments, the first ocean detector 3-11 may be a sea surface monitoring sensor configured to perform ocean profile detection, such as an ocean temperature, an ocean salinity, an ocean current speed, a current direction, or the like.

In some embodiments of the present disclosure, the profile observation module is constructed, the gravity regulation bin is innovatively set, and the gravity is regulated by regulating the ratio of water to gas in the bin to change the combined force of the buoyancy and the gravity, thereby realizing the upward and downward movements of the device, and effectively replacing the conventional high energy consumption program of using ropes to directly pull up the device. Meanwhile, a portion of the energy in the sinking of the profile observation module is converted into the elastic potential energy using the clockwork and released in the upward movement of the device, so as to reduce energy consumption, thereby realizing low-energy-consumption automatic oceanographic and meteorological observation. In addition, a plurality of floating body strips are provided on the rope, which can protect the rope and improve the service life of the rope, and increase the buoyancy, thereby reducing the energy consumption during the upward movement of the device.

In some embodiments, as shown in FIG. 4, the low-energy-consumption floating automatic oceanographic and meteorological observation platform may further include a gas supply device 3-12. The gas supply device 3-12 may be connected with the high-pressure gas storage cylinder 3-9 and configured to temporarily replenish the high-pressure gas storage cylinder 3-9.

The gas supply device 3-12 is a device used to temporarily replenish the high-pressure gas storage cylinder 3-9. In some embodiments, the gas supply device 3-12 may perform temporary gas supply when the high-pressure gas storage cylinder 3-9 is insufficient in gas.

In some embodiments, as shown in FIG. 4, the gas supply device 3-12 may include an air compression device 3-12-1 and/or a gas generation device 3-12-2.

The air compression device 3-12-1 is a device that compresses air above sea level to replenish the high-pressure gas storage cylinder 3-9. In some embodiments, the air compression device 3-12-1 may include an intake pipeline connected to sea level and a compressor. Merely by way of example, the compressor may compress air above sea level through the intake pipeline, and the gas supply device 3-12 may transport the compressed air to the high-pressure gas storage cylinder 3-9 for replenishment. The air compression device 3-12-1 consumes electricity to replenish the high-pressure gas storage cylinder 3-9.

The gas generation device 3-12-2 is a device for generating gas. In some embodiments, the gas generation device 3-12-2 may be provided with a solid or liquid compound (e.g., sodium bicarbonate, an acid, etc.) that generates gas through a chemical reaction to replenish the high-pressure gas storage cylinder 3-9.

In some embodiments of the present disclosure, by providing the air compression device and the gas generation device in the gas supply device, the high-pressure gas storage cylinder can be replenished in various ways when the high-pressure gas storage cylinder is insufficient in gas.

In some embodiments, the control center 1-7 may control the air compression device to operate in response to determining that a remaining power of the storage battery 1-6 and a storage volume of the high-pressure gas storage cylinder 3-9 meet a first preset condition.

The first preset condition is a condition for determining whether to operate the air compression device 3-12-1. In some embodiments, the first preset condition may be that the remaining power of the storage battery 1-6 is greater than a power threshold, and that a gas storage of the high-pressure gas storage cylinder 3-9 is less than a storage threshold. The gas storage of the high-pressure gas storage cylinder 3-9 is a gas storage obtained when the upper two electrically operated gates 3-10 of the gravity regulation bin 3-7 are closed. In some embodiments, the gas storage may be determined by a gas sensor disposed in the high-pressure gas storage cylinder 3-9. The power threshold and the gas storage threshold may be set by a skilled person based on experience. For example, the gas storage threshold may be an amount of gas required for fully filling the gravity regulation bin 3-7. More descriptions regarding the gas sensor may be found in the present disclosure below.

In some embodiments, in response to determining that the remaining power of the storage battery 1-6 and the gas storage of the high-pressure gas storage cylinder 3-9 meet the first preset condition, the control center 1-7 may control the air compression device 3-12-1 to compress the air above sea level to replenish the high-pressure gas storage cylinder 3-9.

In some embodiments of the present disclosure, the high-pressure gas storage cylinder is replenished with air by the air compression device, which helps to continuously replenish air when the battery is full, allows the high-pressure gas storage cylinder to operate stably, and regulates the ratio of gas to water in the bin.

In some embodiments, the control center 1-7 may control the gas generation device to operate in response to determining that the remaining power of the storage battery 1-6 and the gas storage of of the high-pressure gas storage cylinders 3-9 meet a second preset condition.

The second preset condition is a condition for determining whether to operate the gas generation device 3-12-2. In some embodiments, the second preset condition may be that the remaining power of the storage battery 1-6 is less than the power threshold and that the gas storage of the high-pressure gas storage cylinder 3-9 is less than the gas storage threshold.

In some embodiments, in response to determining that the remaining power of the storage battery 1-6 and the gas storage of the high-pressure gas storage cylinder 3-9 meet the second preset condition, the control center 1-7 may control the gas generation device to generate gas to replenish the high-pressure gas storage cylinder 3-9.

In some embodiments of the present disclosure, the high-pressure gas storage cylinder is replenished by the gas generation device, which is conducive to temporarily replenishing gas when the remaining power of the storage battery is insufficient, thereby ensuring stable operation of the high-pressure gas storage cylinder.

In some embodiments of the present disclosure, by providing the gas supply device, the high-pressure gas storage cylinder can be replenished with gas in time to ensure that the platform can operate normally for a long time.

In some embodiments, as shown in FIG. 4, a water level sensor 3-7-1 may be disposed in the gravity regulation bin 3-7 and configured to determine an amount of water in the bin.

The water level sensor 3-7-1 is a sensor monitoring the amount of water in the bin. The amount of water in the bin may correspond to an amount of water in the gravity regulation bin.

In some embodiments of the present disclosure, by providing the water level sensor, the amount of water in the bin can be monitored in time to ensure that the water level in the gravity regulation bin is normal.

In some embodiments, as shown in FIG. 4, a gas sensor 3-7-2 may be disposed in the gravity regulation bin 3-7 and configured to determine an amount of gas in the bin.

The gas sensor 3-7-2 is a sensor for obtaining the amount of gas in the bin. The amount of gas in the bin may correspond to an amount of gas in the gravity regulation bin.

In some embodiments of the present disclosure, by providing the gas sensor, the amount of gas in the bin can be monitored in time to ensure that the amount of gas in the gravity regulation bin is normal, so as to achieve the effect of controlling the ratio of the amount of gas to the amount of water in the bin.

FIG. 5 is a flowchart illustrating an exemplary process of determining profile observation data according to some embodiments of the present disclosure. As shown in FIG. 5, a process 500 may include the following operations. In some embodiments, the process 500 may be performed by the control center 1-7.

In some embodiments, the control center 1-7 may be further configured to: perform preliminary prediction of profile observation data at different depths under the sea surface through a prediction model based on terrain information, meteorological data at a previous moment collected by a meteorological detector, sea surface data at the previous moment collected by a second ocean detector, and profile observation data at the previous moment to obtain preliminary prediction data at the current moment, the prediction model being a machine learning model; determine a collection strategy at the current moment based on the preliminary prediction data; control a profile observation module to perform data collection based on the collection strategy to obtain profile collection data at the current moment; determine whether a parameter of the prediction model needs to be adjusted based on the preliminary prediction data and the profile collection data; in response to determining that the parameter of the prediction model needs to be adjusted, adjust the parameter of the prediction model based on the preliminary prediction data and the profile collection data, and re-predict based on the adjusted prediction model to obtain prediction data at the current moment, and determine profile observation data at the current moment based on the prediction data and the profile collection data; and in response to determining that the parameter of the prediction model does not need to be adjusted, determine the profile observation data at the current moment based on the preliminary prediction data and the profile collection data.

In 510, preliminary prediction of profile observation data at different depths under a sea surface may be performed through a prediction model based on terrain information, meteorological data at a previous moment collected by a meteorological detector, sea surface data at the previous moment collected by a second ocean detector, and profile observation data at the previous moment to obtain preliminary prediction data at the current moment, the prediction model being a machine learning model.

The terrain information is information related to the terrain of a geographical location where the current platform is located. For example, the terrain information may include an elevation, a landform, or the like, around the geographical location where the current platform is located.

In some embodiments, the control center 1-7 may obtain the terrain information through user input. For example, a user may obtain the terrain information of the geographical location where the current platform is located using an open-source dataset and input the terrain information into the data collector 1-5, and the control center 1-7 may obtain the terrain information from the data collector 1-5.

The previous moment corresponds to a moment before the data collection; the current moment corresponds to a current moment of data collection.

The profile observation data is data that reflects profile conditions at different depths below the sea surface. For example, the profile observation data may include a profile temperature, a profile salinity, a profile current speed, or the like. In some embodiments, at the beginning of collection, the profile observation module 3 may use initially collected profile collection data as the profile observation data at an initial moment, and then continuously obtain profile observation data at subsequent moments according to the process 500. More descriptions regarding the profile collection data may be found in operation 530.

The preliminary prediction data refers to preliminarily predicted profile observation data.

The prediction model is a model used to predict the profile observation data. In some embodiments, the prediction model may be a machine learning model. For example, the prediction model may be a recurrent neural network (RNN) model, or the like.

In some embodiments, an input of the prediction model may include the terrain information, the meteorological data at the previous moment, the sea surface data at the previous moment, and the profile observation data at the previous moment, and an output of the prediction model may include the preliminary prediction data at the current moment.

In some embodiments, the prediction model may be obtained by training based on a large number of first training samples with first labels. In some embodiments, the first training samples of the prediction model may include sample terrain information, meteorological data at a sample moment, sea surface data at the sample moment, and profile observation data at the sample moment in historical data. Actual profile collection data at a next moment corresponding to the sample moment of each of the first training samples may be used as the first labels.

In some embodiments, the control center 1-7 may input a large number of first training samples into an initial prediction model, construct a loss function based on the output of the initial prediction model and the first labels, and iteratively update the initial prediction model based on the loss function. When a value of the loss function meets an iteration completion condition, the training may be completed and a trained prediction model may be obtained. The iteration completion condition may include that the loss function converges, a count of iterations reaches a threshold, or the like.

In 520, a collection strategy at a current moment may be determined based on the preliminary prediction data.

The collection strategy refers to a strategy of the profile observation module for data collection under the sea surface.

Collection values of data at different depths below the sea surface may be different. In some embodiments, the collection strategy may include a target depth, and a collection frequency and a collection duration corresponding to the target depth. For example, the collection strategy may include collecting at a depth of 0.5 m by 10 times per minute for 1 min, at a depth of 1 m by 10 times per minute for 2 min, and at a depth of 2 m by 5 times per minute for 5 min. The target depth is a depth at which profile detection is required. One or more target depths may be provided.

In some embodiments, the control center 1-7 may determine the collection strategy at the current moment based on the preliminary prediction data in various ways. For example, the control center 1-7 may determine the collection strategy at the current moment by querying a first preset table based on the preliminary prediction data. The first preset table may contain a correspondence between the preliminary prediction data and the collection strategy. The correspondence may be determined manually based on historical records and experience.

In some embodiments, the control center 1-7 may be further configured to adjust the collection strategy based on a remaining power of a storage battery. For example, the control center 1-7 may adjust the collection frequency and/or the collection duration in the collection strategy based on the remaining power of the storage battery.

For example, in response to determining that the remaining power of the storage battery is less than a first threshold, the control center 1-7 may simultaneously reduce the collection frequency and the collection duration; in response to determining that the remaining power of the storage battery between the first threshold and a second threshold, the control center 1-7 may reduce the collection frequency while remaining the collection duration constant; and in response to determining that the remaining power of the storage battery is greater than the second threshold, the control center 1-7 may not adjust the collection strategy. The first threshold and the second threshold may be power adjustment thresholds, and may be manually preset. The first threshold may be less than the second threshold.

In some embodiments of the present disclosure, by adjusting the collection strategy based on the remaining power of the storage battery, the remaining detectors operating simultaneously can be considered, such that the power can ensure meteorological, sea surface, and profile monitoring simultaneously.

In 530, a profile observation module may be controlled to perform data collection based on the collection strategy to obtain profile collection data at the current moment.

The profile collection data refers to collection data of profiles at different depths below the sea surface. In some embodiments, the profile collection data may be obtained by the first ocean detector 3-11.

In some embodiments, the control center 1-7 may determine a control parameter based on the collection strategy and obtain the profile collection data based on the control parameter. For example, the control center 1-7 may determine the control parameter through a preset algorithm based on the collection strategy, and control the profile observation module 3 to perform data collection based on the control parameter to obtain the profile collection data. The control parameter refers to a related parameter for controlling the electrically operated gas valve 3-8 and the electrically operated gates 3-10, such as a valve opening and an opening duration of the electrically operated gas valve 3-8 and the electrically operated gates 3-10. The preset algorithm may be preset by a skilled person, and may include PID control, state space control, or the like.

In some embodiments, the control center 1-7 may be further configured to: determine, based on the collection strategy, a path control strategy; determine, based on the collection strategy and the path control strategy, the control parameter of the profile observation module, and control the profile observation module to operate based on the control parameter to obtain the profile collection data.

The path control strategy is a strategy for controlling the first ocean detector from a current depth to a target depth. The current depth may be obtained by calculating data provided by a water level sensor.

In some embodiments, the path control strategy may include one of a direct reach strategy and a multi-step reach strategy. The direct reach strategy is a strategy of reaching the target depth from the current depth without interruption, which requires less data collection and processing, and less power consumption. The multi-step reach strategy is a strategy of reaching target depth from the current depth through multiple steps, which needs to re-determine the control parameter at each step, and thus has higher accuracy and avoids the waste of gas consumption.

In some embodiments, the control center 1-7 may determine the path control strategy based on the collection strategy in multiple ways. For example, the control center 1-7 may determine the path control strategy by querying a second preset table based on the collection strategy. The second preset table may contain a correspondence between the collection strategy and the path control strategy. The correspondence may be determined manually based on historical records and experience.

For example, in the second preset table, when a difference between the target depth and the current depth of the collection strategy is different, the difference may correspond to a different number of steps, the number of steps being an integer greater than or equal to 1. For example, the smaller the difference, the smaller the number of steps. If the number of steps is 1, it means that the path control strategy is the direct reach strategy, and if the number of steps is a number greater than 1 (e.g., N), it means that the path control strategy is the multi-step reach strategy, and the number of steps is N.

In some embodiments, the control center 1-7 may be further configured to: process, based on the preset algorithm, the meteorological data at the previous moment, the sea surface data at the previous moment, and the profile collection data at the previous moment to obtain a main influence feature; and determine, based on the target depth, a depth at the previous moment, the main influence feature, and the number of steps of the multi-step reach strategy, the path control strategy through an energy consumption prediction model.

The main influence feature is a main feature that has an influence on energy consumption.

In some embodiments, the control center 1-7 may process the meteorological data at the previous moment, the sea surface data at the previous moment, and the profile collection data at the previous moment based on the preset algorithm to obtain the main influence feature. For example, the preset algorithm may be a principal component analysis (PCA) algorithm, and the control center may determine, based on the PCA algorithm, a portion of the meteorological data at the previous moment, the sea surface data at the previous moment, and the profile collection data at the previous moment as the main influence feature to reduce training data required for subsequent training of the energy consumption prediction model.

The energy consumption prediction model is a model for predicting energy consumption corresponding to the path control strategy. In some embodiments, the energy consumption prediction model may be a machine learning model. For example, the energy consumption prediction model may be one of a neural network model (NN), a deep neural network model (DNN), or the like, or any combination thereof. In some embodiments, an input of the energy consumption prediction model may include the target depth, the depth at the previous moment, the main influence feature, and the number of steps of the multi-step reach strategy, and an output of the energy consumption prediction model may include energy consumption of the direct reach strategy and energy consumption of the multi-step reach strategy.

The energy consumption of the direct reach strategy refers to an amount of electricity and an amount of gas consumed when the path control strategy uses the direct reach strategy.

The energy consumption of the multi-step reach strategy refers to an amount of electricity and an amount of gas consumed when the path control strategy uses the multi-step reach strategy.

In some embodiments, the energy consumption prediction model may be obtained by training based on a large number of second training samples with second labels. The second training samples may include a sample target depth, a sample depth at the previous moment, a sample main influence feature, and a sample number of steps of the multi-step reach strategy in test data. The second labels may include actually measured energy consumption corresponding to the second training samples. It can be understood that at least one of the sample target depth, the sample depth at the previous moment, the sample main influence feature, and the sample number of steps of the multi-step reach strategy may be different for different second training samples.

In some embodiments, the second labels may be obtained by two actual measurements for the second training samples. For example, the first actual measurement may be that the second training samples adopt the direct reach strategy and measure an actual energy consumption as a label corresponding to the energy consumption of the direct reach strategy, and the second empirical measurement may be that the second training samples adopt the multi-step reach strategy and measure an actual energy consumption as the actual energy consumption of the multi-step reach strategy. The power consumption in the actual energy consumption may be obtained based on a power change of the storage battery, and the gas consumption may be obtained based on a gas change in the high-pressure gas storage cylinder.

In some embodiments, the energy consumption prediction model may be trained in a manner similar to that of the prediction model, which may be found in the related descriptions of the operation 510.

In some embodiments, the control center 1-7 may determine, based on the target depth, the depth at the previous moment, the main influence feature, and the number of steps of the multi-step reach strategy, energy consumptions of different path control strategies through the energy consumption prediction model, and select a path control strategy with the minimum energy consumption as the final path control strategy.

In some embodiments, the path control strategy is determined through the energy consumption prediction model, such that the energy consumptions of different path control strategies can be more accurately predicted, and the more reasonable path control strategy can be selected, thereby improving the endurance of the platform, and avoiding unnecessary waste.

In some embodiments, the input of the energy consumption prediction model may include a plurality of steps of the multi-step strategy, and the output of the energy consumption prediction model may include an energy consumption corresponding to each step. For example, a plurality of values may be input when the number of steps of the multi-step strategy is input. For example, "2, 3, 4" are input into the energy consumption prediction model, and the output includes an energy consumption of the direct reach strategy and energy consumptions of the multi-step reach strategy corresponding to the three steps.

In some embodiments of the present disclosure, by inputting a plurality of steps into the energy consumption prediction model, the energy consumptions of the multi-step reach strategy corresponding to the plurality of steps can be predicted simultaneously, and the energy consumption can be predicted more rapidly and accurately, so as to make more reasonable selection of the path control strategy.

In some embodiments, the input of the energy consumption prediction model may include an amount of water in the bin and an amount of gas in the bin. More descriptions regarding the amount of water in the bin and the amount of gas in the bin may be found in the present disclosure above.

In some embodiments, when the input of the energy consumption prediction model includes the amount of water in the bin and the amount of gas in the bin, the control center 1-7 may add a sample amount of water in the bin and a sample amount of gas in the bin corresponding to a sample to the second training samples during training of the energy consumption prediction model. The specific training method is similar to the training method described above, which may be found in the present disclosure above.

In some embodiments of the present disclosure, by adding the amount of water in the bin and the amount of gas in the bin to the input of the energy consumption prediction model, the effect of the ratio of the amount of water in the gravity regulation bin to the amount of gas in the bin on the stability of the platform can be considered, which makes a more accurate prediction of the energy consumption by the energy consumption prediction model.

In some embodiments, the control center 1-7 may determine the control parameter of the profile observation module based on the collection strategy and the path control strategy, and control the profile observation module to operate based on the control parameter to obtain the profile collection data. For example, the control center 1-7 may determine, based on the path control strategy, the control parameter through the present algorithm based on the collection strategy again in each step, and control the profile observation module to operate based on the control parameter to obtain the profile collection data. More descriptions regarding the preset algorithm may be found in the present disclosure above.

In 540, whether a parameter of the prediction model needs to be adjusted may be determined based on the preliminary prediction data and the profile collection data. In some embodiments, the control center 1-7 may determine, based on the preliminary prediction data and the profile collection data, whether the parameter of the prediction model needs to be adjusted in various ways. For example, the control center 1-7 may compare a difference between the preliminary prediction data and the profile collection data, and determine that the parameter of the prediction model needs to be adjusted in response to determining that the difference is greater than a difference threshold. The difference threshold may be preset by a skilled person.

In 550, in response to determining that the parameter of the prediction model needs to be adjusted, operations 551-552 may be performed.

In 551, a model parameter of the prediction model may be adjusted based on the preliminary prediction data and the profile collection data.

In some embodiments, the control center 1-7 may adjust the model parameter of the prediction model based on the preliminary prediction data and the profile collection data in various ways. For example, the control center 1-7 may perform fine adjustment on the model parameter of the prediction model through a data assimilation technique (e.g., Kalman filtering, variational assimilation, particle filtering, etc.) based on the difference between the preliminary prediction data and the profile collection data.

In 552, re-prediction may be performed based on an adjusted prediction model to obtain prediction data at the current moment, and profile observation data at the current moment may be determined based on the prediction data and the profile collection data.

The prediction data refers to prediction of the profile observation data by the adjusted prediction model.

In some embodiments, the control center 1-7 may determine the profile observation data at the current moment in various ways based on the prediction data obtained by the prediction model through re-prediction and the profile collection data. For example, the control center may perform a weighted summation based on the prediction data and the profile collection data to obtain the profile observation data at the current moment.

For example, for the same type of data in the prediction data and the profile collection data, the profile observation data may be calculated based on the following equation (1):

$$P = a*Y + b*C \qquad (1)$$

wherein P denotes the profile observation data, a denotes a weight corresponding to the prediction data, b denotes a weight corresponding to the profile collection data, a sum of a and b being 1, Y denotes the prediction data, and C denotes the profile collection data.

In some embodiments, the value of a may be positively correlated with a wind speed and/or an ocean current speed at the previous moment. For example, the greater the wind speed and/or the ocean current speed, the less stable the current environment, the profile collection data may not be as reliable as the prediction data, and thus the higher the value of a. For example, the weight a may be determined by setting a third preset table. The third preset table may include a correspondence between the wind speed and/or the ocean current speed and the value of a, which may be preset by a skilled person. The wind speed at the previous moment may be obtained from the meteorological data at the previous moment, and the ocean current speed may be obtained from the sea surface data at the previous moment.

In some embodiments of the present disclosure, the profile observation data is determined by combining the prediction data outputted by the prediction model and the actually observed profile collection data, such that a large deviation between one of the data and the actual condition can be avoided, and a comprehensive value that is closer to the overall condition can be obtained.

In 560, in response to determining that the parameter of the prediction model does not need to be adjusted, operation 561 may be performed.

In 561, the profile observation data at the current moment may be determined based on the preliminary prediction data and the profile collection data.

The manner of determining the profile observations at the current moment based on the preliminary prediction data and the profile collection data may be similar to the manner of determining the profile observation data at the current moment based on the prediction data and the profile collection data as described above, which can be found in the present disclosure above.

In some embodiments, the control center may repeatedly perform the operations 510-560 until the collection of the profile observation data at all target depths is completed.

In some embodiments of the present disclosure, by updating the collection strategy and the path control strategy at each moment based on the related data at the previous moment, adjusting the model parameter of the prediction model at the appropriate time, and combining the (preliminary) prediction data and the profile collection data, the obtained profile observation data can be more accurate and more in line with the actual condition of ocean profile.

It should be noted that the foregoing description of the process 500 is intended to be exemplary and illustrative only and does not limit the scope of application of the present disclosure. For a person skilled in the art, various corrections and changes can be made to the process 500 under the guidance of the present disclosure. However, these corrections and changes remain within the scope of the present disclosure.

For example, the operation process of the embodiments of the present disclosure includes the following content. When the platform is activated, the meteorological observation module and the sea surface monitoring module perform automatic sounding of the atmosphere and the sea surface under the coordination of the control center, and store the collected data in the data collector. For the profile observation module, the four electrically operated gates of the gravity regulation bin are closed at the initial stage. When observation is required, the four electrically operated gates of the gravity regulation bin are opened, and the water flow enters the gravity regulation bin. The air is excluded, the buoyancy is constant, the gravity increases, the combined force of the gravity and the buoyancy of the device is downward, and the gravity regulation bin and the first ocean detector sink to drive the rope to sink, and the clockwork gradually contracts. The gravitational potential energy of the whole module decreases, the kinetic energy increases, and the elastic potential energy also increases. After sinking for a certain distance, the upper middle two electrically operated gates of the gravity regulation bin are closed, and the electrically operated gas valve is opened for a period of time for intake to exclude the water flow from the bottom. After a period of time, the lower two electrically operated gates are also closed. In this case, the amount of water in the device decreases, the buoyancy is constant, the gravity decreases, and the combined force of the gravity and the buoyancy is upward, causing the gravity regulation bin and the first ocean detector to decelerate sinking and gradually ascend. The clockwork begins to release the elastic potential energy, pulling the rope to ascend to prevent the rope from loosening when the gravity regulation bin and the first ocean detector ascend. When ascending to a height close to the sea surface, the first ocean detector communicates with the control center and transmits data to the data collector to complete the collection of profile data, so as to finally realize the synchronous and automatic multi-dimensional observation of the atmosphere, sea surface, and profile.

The foregoing is only the embodiments of the present disclosure, and is not intended to limit the scope of protection of the present disclosure. Any equivalent structure or equivalent process transformations utilizing the contents of the specification of the present disclosure or directly or indirectly applying them in other related technical fields are also included in the scope of protection of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by +20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A low-energy-consumption floating automatic oceanographic and meteorological observation platform, comprising a meteorological observation module, a sea surface monitoring module, a profile observation module, floating body strips, and a rope channel; wherein
the meteorological observation module is configured to provide a buoyant platform to realize observation of meteorological data while guaranteeing power supply and providing a space for equipment placement;
the sea surface monitoring module is configured to realize observation of sea surface data while preventing the buoyant platform from drifting;
the profile observation module is located below the meteorological observation module and configured to complete automatic observation of an ocean profile in a low energy consumption manner;
the profile observation module includes a bobbin, a clockwork, a rope, a gravity regulation bin, an electrically operated gas valve, a high-pressure gas storage cylinder, electrically operated gates, and a first ocean detector;
the bobbin is configured to wind and store the rope;
the clockwork is secured to the bobbin and configured to convert a portion of kinetic energy generated during sinking of the first ocean detector into elastic potential energy to be stored and released in a subsequent upward movement;
the rope is configured to connect the gravity regulation bin and the first ocean detector;
the gravity regulation bin is configured to regulate gravity to realize upward and downward movements of the first ocean detector;
the electrically operated gas valve is configured to regulate a gas release process in the high-pressure gas storage cylinder, i.e., an intake process;
the meteorological observation module includes a communication antenna, a meteorological detector, a hollow support barrel, a solar panel, and a data collector;
the communication antenna is configured to communicate with a remote transmitting device;
the meteorological detector is configured to detect an atmospheric condition and generate the meteorological data;
the hollow support barrel is configured to support the communication antenna and the meteorological detector;
the solar panel being configured to generate electricity;
the data collector is configured to collect and store data generated by various detectors;
the sea surface monitoring module includes a floating body block, a connection chain, a second ocean detector, and an anchor chain;
the floating body block is configured to disperse a sinking position of the anchor chain, display positioning, and provide identification;
the connection chain is connected with the meteorological observation module and configured to transmit a force to stabilize the buoyant platform;
the second ocean detector is configured to detect an ocean state of a sea surface and generate the sea surface data;
the anchor chain is configured for anchoring to prevent the buoyant platform from drifting;
the meteorological observation module further includes a control center, the control center being configured to control the electrically operated gas valve and the electrically operated gates to regulate time of gas intake, water intake, exhaust, and drainage;
the control center is secured in a floating body housing, the floating body housing being configured to insulate internal devices from wind and waves and provide buoyancy;
the floating body strips is secured to the rope and configured to increase the buoyancy of the rope to reduce energy consumption of the first ocean detector during the upward movement;
the rope channel is configured to reduce friction loss due to motion steering during upward and downward movements of the rope.

2. The low-energy-consumption floating automatic oceanographic and meteorological observation platform of claim 1, wherein the floating body housing further includes a storage battery configured to store and supply electricity.

3. The low-energy-consumption floating automatic oceanographic and meteorological observation platform of claim 1, wherein the second ocean detector is configured to detect an ocean temperature, an ocean salinity, an ocean current speed, a current direction, an ocean water level, a dissolved oxygen concentration, and a pH value.

4. The low-energy-consumption floating automatic oceanographic and meteorological observation platform of claim 1, further comprising a connection rod, wherein the connection rod is configured to support the rope channel.

5. The low-energy-consumption floating automatic oceanographic and meteorological observation platform of claim 1, wherein the first ocean detector is configured to detect an ocean temperature, an ocean salinity, an ocean current speed, and a current direction.

* * * * *